United States Patent
Pauly et al.

(10) Patent No.: US 12,159,213 B2
(45) Date of Patent: Dec. 3, 2024

(54) SOURCE-AGNOSTIC IMAGE PROCESSING

(71) Applicant: Intrinsic Innovation LLC, Mountain View, CA (US)

(72) Inventors: Olivier Pauly, Munich (DE); Stefan Hinterstoisser, Munich (DE); Hauke Heibel, Höhenkirchen-Siegertsbrunn (DE); Martina Marek, Munich (DE); Martin Bokeloh, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 1021 days.

(21) Appl. No.: 17/089,631

(22) Filed: Nov. 4, 2020

(65) Prior Publication Data

US 2022/0138535 A1 May 5, 2022

(51) Int. Cl.
| | |
|---|---|
| *G06N 3/04* | (2023.01) |
| *G06F 18/214* | (2023.01) |
| *G06F 18/24* | (2023.01) |
| *G06N 3/045* | (2023.01) |
| *G06N 3/08* | (2023.01) |
| *G06V 10/75* | (2022.01) |

(52) U.S. Cl.
CPC .......... *G06N 3/045* (2023.01); *G06F 18/2155* (2023.01); *G06F 18/24* (2023.01); *G06N 3/08* (2013.01); *G06V 10/751* (2022.01)

(58) Field of Classification Search
CPC ....... G06N 3/08; G06N 3/045; G06F 18/2155
See application file for complete search history.

(56) References Cited

U.S. PATENT DOCUMENTS

| 9,224,205 B2 | 12/2015 | Tsin et al. |
| 2017/0140253 A1 | 5/2017 | Wshah et al. |

(Continued)

FOREIGN PATENT DOCUMENTS

| WO | WO 2019/084562 | 5/2019 |
| WO | WO 2020/102767 | 5/2020 |

OTHER PUBLICATIONS

Weinrich, "Appearance-Based 3D Upper-Body Pose Estimation and Person Re-Identification on Mobile Robots" IEEE, 2013 (Year: 2013).*

(Continued)

*Primary Examiner* — Van C Mang
(74) *Attorney, Agent, or Firm* — Fish & Richardson P.C.

(57) ABSTRACT

Methods, systems, and apparatus, including computer programs encoded on computer storage media, for processing image data. One of the method includes receiving an input image from a source domain, the input image showing an object to be manipulated by a robot in a robotic process; processing the input image to generate an intermediate representation of the input image, comprising: generating a gradient orientation representation and a gradient magnitude representation of the input image; and generating the intermediate representation of the input image from the gradient orientation representation and the gradient magnitude representation; processing the intermediate representation of the input image using a neural network trained to make predictions about objects in images to generate a network output that represents a prediction about physical characteristics of the object in the input image.

20 Claims, 4 Drawing Sheets

(56) References Cited

U.S. PATENT DOCUMENTS

| | | |
|---|---|---|
| 2017/0220904 A1 | 8/2017 | Bai et al. |
| 2019/0087694 A1 | 3/2019 | Inoue |
| 2020/0130177 A1* | 4/2020 | Kolouri .................. G06N 3/045 |
| 2020/0175828 A1 | 6/2020 | Bhatia |

OTHER PUBLICATIONS

Lin, "Learning Based Semantic Segmentation for Robot Navigation in Outdoor Environment", 2017 (Year: 2017).*
Patel, "Fruit Detection using Improved Multiple Features based Algorithm", IEEE, 2017 (Year: 2017).*
Zachary Taylor, "Automatic Calibration of Multi-Modal Sensor Systems using a Gradient Orientation Measure", IEEE, 2013 (Year: 2013).*
Beran et al., "Image Processing Methods Usable for Object Detection on the Chessboard," 2016 International Conference on Measurement Instrumentation and Electronics (ICMIE), 2016, 6 pages.
Harris et al., "A combined corner and edge detector," Alvey vision conference, Aug. 1988, 147-151.
Weinrich et al., "Appearance-based 3d upper-body pose estimation and person re-identification on mobile robots," 2013 IEEE International Conference on Systems, Man, and Cybernetics, Oct. 2013, 4384-4390.
International Search Report and Written Opinion in International Appln. No. PCT/US2021/055497, dated Feb. 8, 2022, 12 pages.

* cited by examiner

SOURCE-AGNOSTIC IMAGE PROCESSING

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Training data that includes real images and corresponding human-assigned labels (e.g., labeled bounding box(es)) has been utilized in training such models. However, generating such labeled training data can be expensive, both in terms of the labor cost relating to the time-consuming labeling process performed by human reviewers as well as the consumption of computational and/or network resources during the labeling process. When labelling of thousands or millions of real images are considered, the time required for the manual labeling process and, the corresponding cost associated with it can both be significant. Moreover, the human-assigned labels can include errors (e.g., misplaced bounding boxes) and the human labelling can be a time-consuming process. Further, setting up various real scenes and capturing real images can also be resource intensive.

Synthetic training data, that includes synthetic images and automatically assigned labels, has also been utilized in training such models. Synthetic training data can overcome some of the drawbacks with training data that includes real images and human-assigned labels. However, training a machine learning model mainly or only on synthetic training data, with synthetic images generated according to various prior techniques, can still result in a significant domain gap. This can be due to, for example, disparities between the synthetic images and real images. The domain gap can result in poor performance of the machine learning model, trained utilizing synthetic training data, when the machine learning model is utilized in making predictions based on real vision data.

SUMMARY

This specification describes how a system can pre-processes the data received from the one or more sensors in order to generate an intermediate representation of the data that can be effectively processed by a perception neural network. The intermediate representation augments domain-invariant features and thus preserves salient information that can better aid the perception neural network in generating accurate perception outputs, including, for example, object detection and/or classification, semantic segmentation, or pose estimation outputs.

Implementations of the system facilitate effective performance of perception neural networks that are used to control or plan robots interacting with a real-world environment based on processing real-world vision data, even when the training data for the networks includes mainly (or solely) synthetic vision data. As a result, improved performance of robots on various machine vision and/or robotics tasks may thus be achieved by virtue of the improvement in their perception-related skills required for these tasks. For example, for a robot to manipulate (e.g., grasp, push, and/or pull) an object, the robot must be able to at least detect the object in vision data (e.g., determine a 2D and/or 3D bounding box that corresponds to the object). As another example, object detection and classification can be utilized by a robot to identify certain type(s) of object(s) and avoid collision with those certain type(s) of object(s).

Particular embodiments of the subject matter described in this specification can be implemented so as to realize one or more of the following advantages.

The disclosed techniques can train neural networks to capture salient information that are domain invariant in scenarios where the data distributions during training and runtime are different. By employing the pre-processing techniques described in this specification, a neural network can effectively and accurately generate perception outputs, even when it has been trained mainly (or solely) on synthetic data, e.g., synthetic images, and then deployed to process real data, e.g., real images, or when the input data at inference stage is captured using one or more different sensors and thus data distributions within the input data may vary. That is, the described pre-processing techniques can allow for the neural network to be effectively trained on synthetic training data, which can typically be generated in massive volumes at a relatively low cost compared with that required for real data, e.g., in terms of computational resource, human labor, or both, while minimizing domain gap.

Because the described pre-processing techniques encourages to focus on learning geometries (or geometry-related characteristics) of various objects shown in the images, the neural network can be a light-weight model that has a different architecture from a cumbersome model that additionally allocates capacity to model changes in illumination, light color, specularities, or reflections in the images. This makes the neural network easier to deploy than the cumbersome model, e.g., because the light-weight model requires less computation, memory, or both, to generate outputs at run time than the cumbersome model. For example, the light-weight model may have fewer layers, fewer parameters, or both than the cumbersome model.

Accordingly, by employing the described pre-processing techniques, a robot system can be provided with the accurate perception network outputs that can then allow it to effectively generate motion plans for controlling the robots, e.g., by generating an initial plan that is optimized based on the sensor observations of the workcell or by generating modified plans to avoid collision of a robot with other physical objects within the workcell that are recently observed by the sensors.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
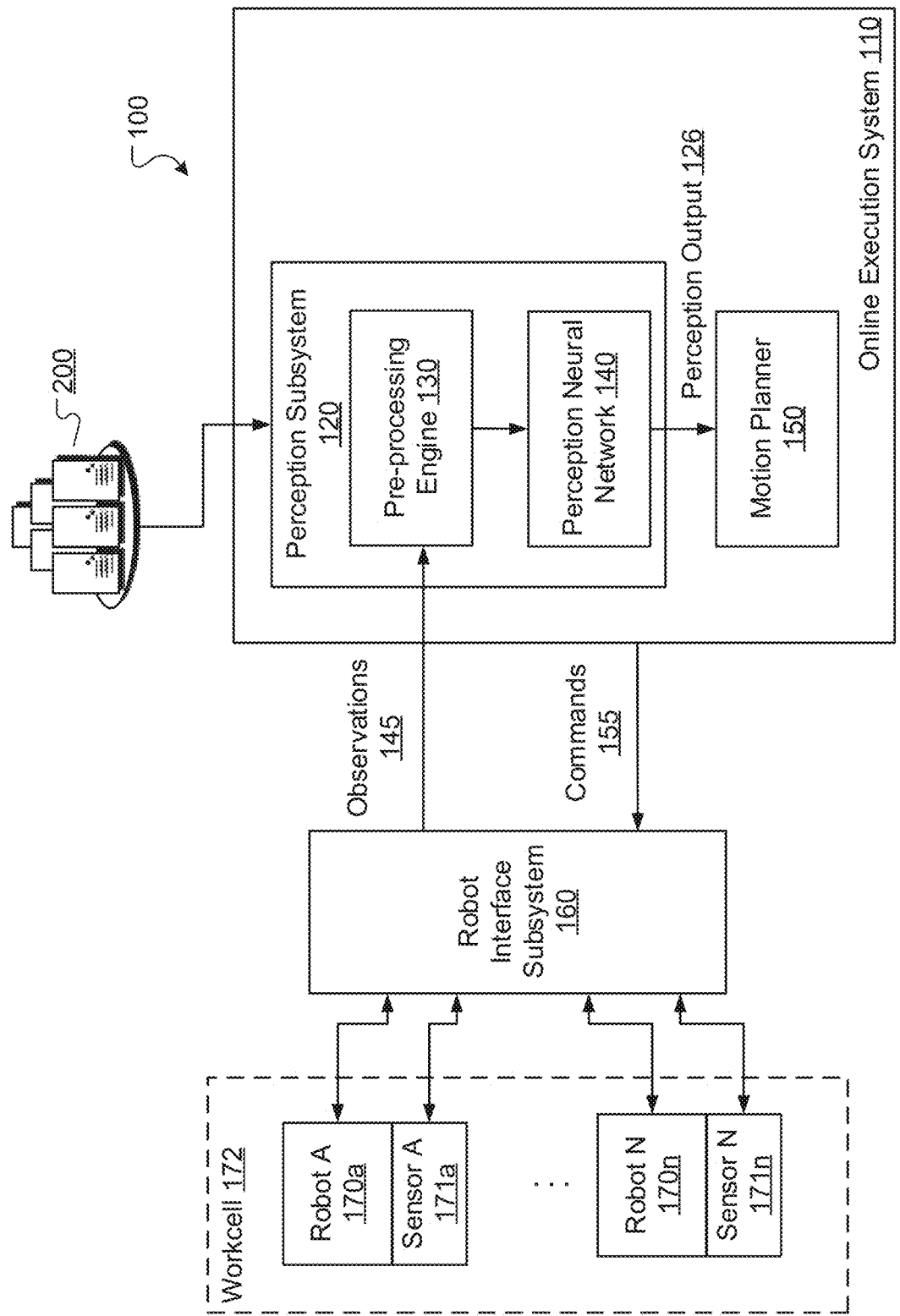
FIG. 1 shows an example robot system.

FIG. 1 is a diagram that illustrates an example system 100. The system 100 is an example of a system that can implement the online robotic control techniques described in this specification.

The system 100 includes a number of functional components, including an online execution system 110 and a robot interface subsystem 160. Each of these components can be implemented as computer programs installed on one or more computers in one or more locations that are coupled to each other through any appropriate communications network, e.g., an intranet or the Internet, or combination of networks.

In general, the online execution system 110 provides commands 155 to be executed by the robot interface subsystem 160, which drives one or more robots, e.g., robots 170a-n, in a workcell 172. In order to compute the commands 155, the online execution system 110 consumes online observations 145 captured by one or more sensors 171a-n making observations within the workcell 172 and, when relevant, additional information including status messages generated by the robots 170a-n. As illustrated in FIG. 1, each sensor 171 is coupled to a respective robot 170. However, the sensors need not have a one-to-one correspondence with robots and need not be coupled to the robots. In fact, each robot can have multiple sensors, and the sensors can be mounted on stationary or movable surfaces in the workcell 172. Any suitable sensors 171 can be used, such as camera sensors, LIDAR sensors, sonar sensors, etc.

The robot interface subsystem 160 and the execution system 110 can operate according to different timing constraints. In some implementations, the robot interface subsystem 160 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The online execution system 110, on the other hand, typically has more flexibility in operation. In other words, the online execution system 110 may, but need not, provide a command 155 within every real-time time window under which the robot interface subsystem 160 operates. However, in order to provide the ability to make sensor-based reactions, the online execution system 110 may still operate under strict timing requirements. In a typical system, the real-time requirements of the robot interface subsystem 160 require that the robots provide a command every 5 milliseconds, while the online requirements of the online execution system 110 specify that the online execution system 110 should provide a command 155 to the robot interface subsystem 160 every 20 milliseconds. However, even if such a command is not received within the online time window, the robot interface subsystem 160 need not necessarily enter a fault state.

Thus, in this specification, the term online refers to both the time and rigidity parameters for operation. The time windows are larger than those for the real-time robot interface subsystem 160, and there is typically more flexibility when the timing constraints are not met.

In operation, the online execution system 110 repeatedly (i.e., at each of multiple time points) obtains observations 145 and issues commands 155 to the robot interface system 160 in order to actually drive the movements of the moveable components, e.g., the joints, of the robots 170a-n.

In some implementations, the robot interface subsystem 160 provides a hardware-agnostic interface so that the commands 155 issued by execution system 110 are compatible with multiple different versions of robots. During execution the robot interface subsystem 160 can report online observations 145 back to the online execution system 110 so that the online execution system 110 can make online adjustments to the robot movements, e.g., due to newly observed obstacles in the robot path or other unanticipated conditions.

Specifically, the execution system 110 issues the commands 155 by using a motion planner 150 to generate new motion plans, adjust current motion plans, or both for the robots 170a-n. In execution, the robots 170a-n generally continually execute the commands 155 specified explicitly or implicitly by the motion plans to perform the various tasks such as, assembly, handling, packing, or gluing tasks, etc. The robots can be real-time robots, which means that the robots are programmed to continually execute their commands according to a highly constrained timeline. For example, each robot can expect a command from the robot interface subsystem 160 at a particular frequency, e.g., 100 Hz or 1 kHz. If the robot does not receive a command that is expected, the robot can enter a fault mode and stop operating.

In order for the motion planner 150 to generate planning decisions which cause the robots 170a-n to operate in a collision-free and efficient manner, the online execution system 110 must provide the motion planner 150 with timely and accurate perception data generated by a perception subsystem 120 which implements one or more perception neural networks 140. Each perception neural network may have a different architecture, e.g., a different deep convolutional architecture, and may be configured to generate a different type of perception output 126. For example, the perception output 126 can be an object detection or classification output, a pose estimation output, or a semantic segmentation output. Ideally the perception neural networks are fully-learned networks. As used in throughout this description, a "fully-learned" network is a network that is trained to compute a desired prediction. In other words, a fully-learned network generates an output based solely on being trained on training data rather than on human-programmed decisions.

Training such neural networks which can each include millions of parameters to achieve state-of-the-art results, however, can be problematic. This is largely due to the generalizability of neural networks under distributional shift in source-varying input data.

First, neural networks mainly trained on data collected in one domain, e.g., synthetic domain, generally have inferior performance on other domains, e.g., real domain. This can be due to, for example, disparities between the synthetic images and real images. The domain gap can result in poor performance of the neural networks, trained utilizing synthetic training data, when the network is deployed to make predictions based on real sensor data.

Second, in cases where the workcell 172 makes use of sensors that are of different makes, models, or configurations, the observations 145 can have different modalities or formats and thus the data distributions among the observations 145 may vary, sometimes widely.

Because of these, the observations 145 received by the online execution system 110 is usually not readily adapted to be processed by the neural network in order to make accurate perception predictions.

Instead, the system 110 pre-processes image data in the observations 145, i.e., by using an image pre-processing engine 130 of the perception subsystem 120, in order to generate an intermediate representation of the image data that can be effectively processed by a perception neural network. The intermediate representation augments domain-invariant features and thus preserves salient information that can better aid the perception neural network in generating accurate perception outputs.

To allow the perception subsystem 120 to effectively cope with source-varying observation inputs, a training system 200 can determine trained values of the perception neural network parameters and, in some implementations, any additional parameters required for pre-processing the input data. Training the networks included in the perception subsystem 120 will be described in more detail below with reference to FIG. 2.

Once trained, the system 110 can use the perception subsystem 120 to pre-process the observations 145 and to generate accurate perception outputs 126 that can assist the motion planner 150 in determining collision-free and efficient motion plans. Generating intermediate representations of observations 145 in a manner that ensures that the perception neural network can make accurate perception predictions about the workcell 172 is described in more detail below with reference to FIG. 3.

In particular, the perception subsystem 120 can use the pre-processing engine 130 to pre-process the observations 145 in order to generate an intermediate representation of the data that augments domain-invariant features and thus preserves salient information that can better aid the perception neural network 140 in generating accurate perception outputs 126, including, for example, object detection and/or classification, semantic segmentation, or pose estimation outputs. The motion planner 150 can then generate the plan for the operating the one or more robots in accordance with the perception outputs 126.

For example, the system 110 can use the intermediate representation of sensor measurements of a workcell to generate an initial motion plan that specifies a path for a robot to follow within the workcell in order to complete one or more skills. The initial motion plan can include the robot maneuvering through an area, or footprint, of a workcell. The initial motion plan can include moving the robot from a starting point to an end point to perform a skill.

As another example, as the robot begins to execute the initial motion plan, one or more sensors within the workcell can provide updated data regarding the robot and/or the workcell. In response, the system 110 can generate intermediate representation of the received senor data and thereafter use the intermediate representation to generate a modified motion plan for the robot that specifies a modified path for the robot to follow that is optimized based on the intermediate representation of the sensor data.

As yet another example, the system 110 can use the intermediate representation of the data provided by the sensor(s) to generate a motion plan for a robot that defines paths for the robot to follow between of sensor-based interaction to be performed by the robot. For example, the system 110 can generate a path between an entry point of a sensor-based skill to the start of a sensor-based interaction of the skill.

In this specification, a robot is a machine having a base position, one or more movable components, and a kinematic model that can be used to map desired positions, poses, or both in one coordinate system, e.g., Cartesian coordinates, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a skill is a sequence of one or more tasks to be performed by the robot, with each task being performed by a particular tool of the robot. For brevity, when a robot has only one tool, a task can be described as an operation to be performed by the robot as a whole. Example tasks that can be included in a skill include welding, glue dispensing, part positioning, and surfacing sanding, to name just a few examples. Skills are generally associated with a type that indicates the tool required to perform the series of tasks in the skill, as well as a position within a workcell at which the series of tasks in the skill will be performed.

In this specification, a transition is a motion plan that describes a movement to be performed between a start point and an end point. The start point and end point can be represented by poses, locations in a coordinate system, or skills to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

In this specification, a motion plan is a data structure that provides information for executing an action, which can be a skill, a cluster of skills, or a transition. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform an action corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained. In some implementations, motion plans represent edges in a skill graph between two configuration states for a single robot. Thus, generally there is one skill graph per robot.

Figure 2:
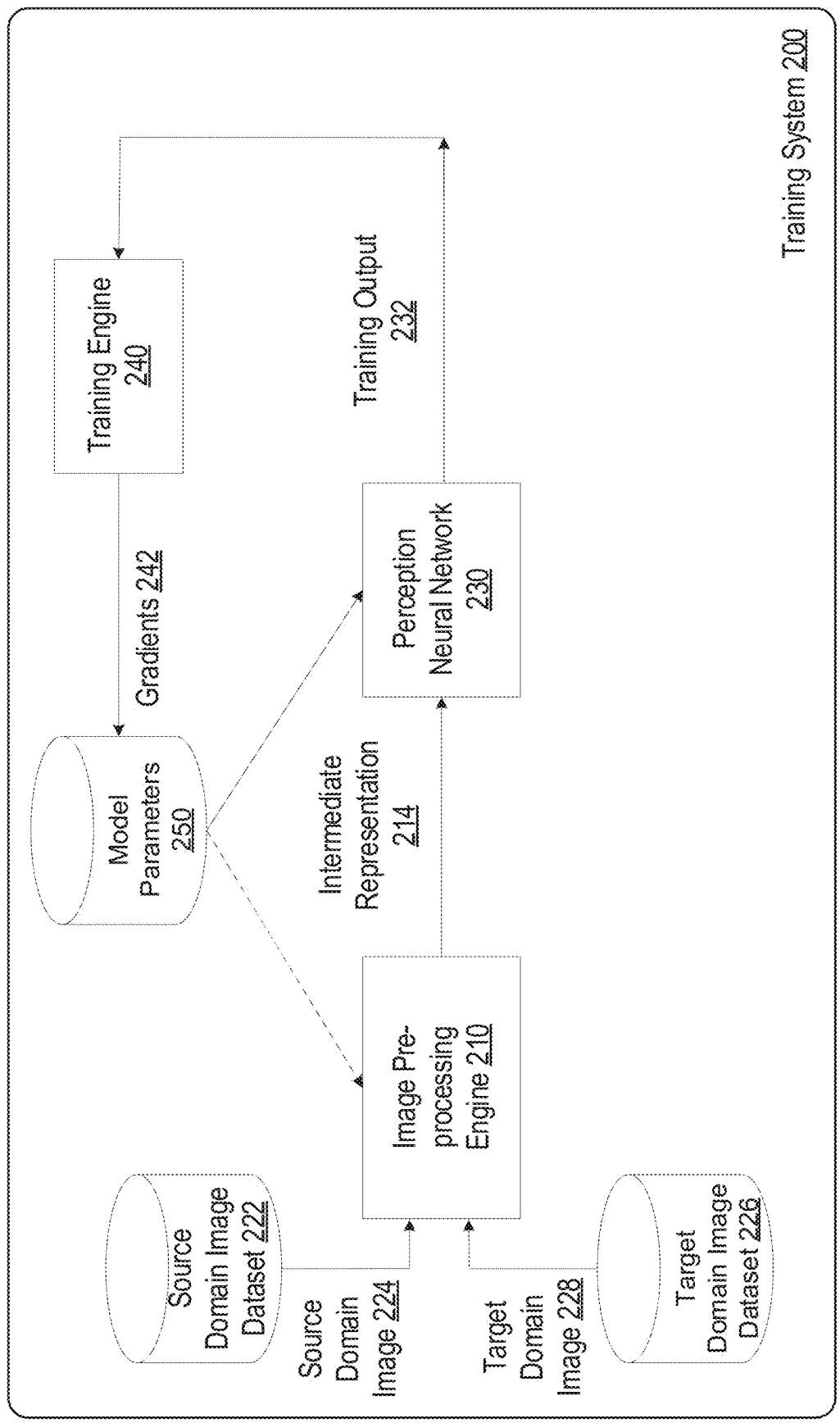
FIG. 2 shows an example neural network training system.

FIG. 2 shows an example neural network training system 200. The training system 200 is an example of a system implemented as computer programs on one or more computers in one or more locations, in which the systems, components, and techniques described below can be implemented.

Because the training process is typically computationally expensive, in some implementations, the training system 200 is implemented by a cloud-based computing system comprising many, possibly thousands, of computers. The training system 200 is thus commonly physically remote from facilities that house the workcell 172, the execution system 110, or both.

In general the system 200 can be used to train any of a variety of neural networks to perform any of a variety of perception tasks. For example, the perception neural network 230 can be configured to identify candidate regions within the input images that are predicted to include specific objects of interest, i.e., to generate a detection output for an input image that includes bounding boxes that specify the boundaries of the candidate regions.

As another example, the perception neural network 230 can be configured to classify input images from the target domain as including images of objects from one or more object categories, i.e., to generate a classification output for an input image that includes a respective score for each of the one or more object categories that represents a likelihood that the input image includes an image of an object that belongs to the object category.

As another example, the perception neural network 230 can be configured to estimate the pose of objects in input images. Generally, the pose of an object is a combination of the position and orientation of the object in the input image. For example, the network 230 can generate an output that specifies an estimated location in the image of each of a predetermined number of body joints of the object.

As another example, the perception neural network 230 can be configured to divide input images into multiple regions, each of which belongs to a different one of a set of categories. For example, the network 230 can output data, e.g., a vector or a matrix, that identifies for each pixel of the input image the category to which the pixel belongs.

The training system 200 maintains a source domain image dataset 222 and, in some cases, a target domain image dataset 226 for use in training the perception neural network 230. In particular, the neural network training system 200 trains the perception neural network 230 mainly on source domain images 224 from the source domain and, optionally on target domain images 228 from the target domain, where the source domain can be a synthetic domain and the target domain can be a real domain. In fact, in some implementations, the system 200 trains the perception neural network 230 only on source domain images 224.

The target domain image dataset 226, when utilized, includes labelled target domain images 228, i.e., real images each associated with corresponding human-assigned annotations or labels (e.g., bounding boxes). Generating the target domain image data can utilize significant computational and/or network resources. For example, in generating human-assigned label(s) for a real image, the real image must be transmitted to a client device utilized by a corresponding human reviewer. The real image is rendered at the client device, and the human reviewer must then utilize the client device to review the image and provides user interface input(s) to assign the label(s). The human-assigned label(s) are then transmitted to a server where they can then be paired with the real image and utilized in training a corresponding machine learning model. When labelling of hundreds of thousands (or even millions) of real images are considered, the transmissions to and from the client device consume significant network resources, and the rendering of the image and the handling of the user interface input(s) consume significant client device resources. Moreover, the human-assigned labels can include errors (e.g., misplaced bounding boxes) and the human labelling can be a time-consuming process. Further, setting up various real scenes and capturing real images can also be resource intensive.

On the other hand, the source domain image dataset 222 includes synthetic images and automatically assigned labels. Synthetic training data can usually be obtained or curated in massive volumes at a relatively low computational and/or human labor cost and thus can overcome some of the drawbacks with training data that includes real images and human-assigned labels.

Generally the target domain image data, even when utilized, can be orders of magnitude smaller than source domain image data. In some implementations, the source domain image dataset 222 comprises multiple millions of labelled synthetic images, while the target domain image dataset 226 comprises merely a few hundred labelled real images.

However, training a machine learning model mainly or only on synthetic training data, with synthetic images generated according to various computer graphics techniques, can result in a significant domain gap. This can be due to, for example, disparities between the synthetic images and real images. The domain gap can result in poor performance of the perception neural network 230, trained utilizing synthetic training data, when the network is deployed to make predictions based on real sensor data.

To assist in the training of the perception neural network 230, the system 200 makes use of an image pre-processing engine 210 that is configured to process an input image to generate an intermediate representation of the input image. The input image can be either a target domain image 228 or a source domain image 224. The intermediate representation 214 is a shared feature representation of features of the input image that are shared between images from the target domain and images from a source domain different from the target domain. For example, the intermediate representation 214 can be a representation that augments domain-invariant features relating to geometry of objects depicted in the input image, while attenuating other domain-specific features including, for example, illumination, light color, specularities, or reflection. The perception neural network 230 then generates a network training output 232 from the intermediate representation 214.

Figure 4:
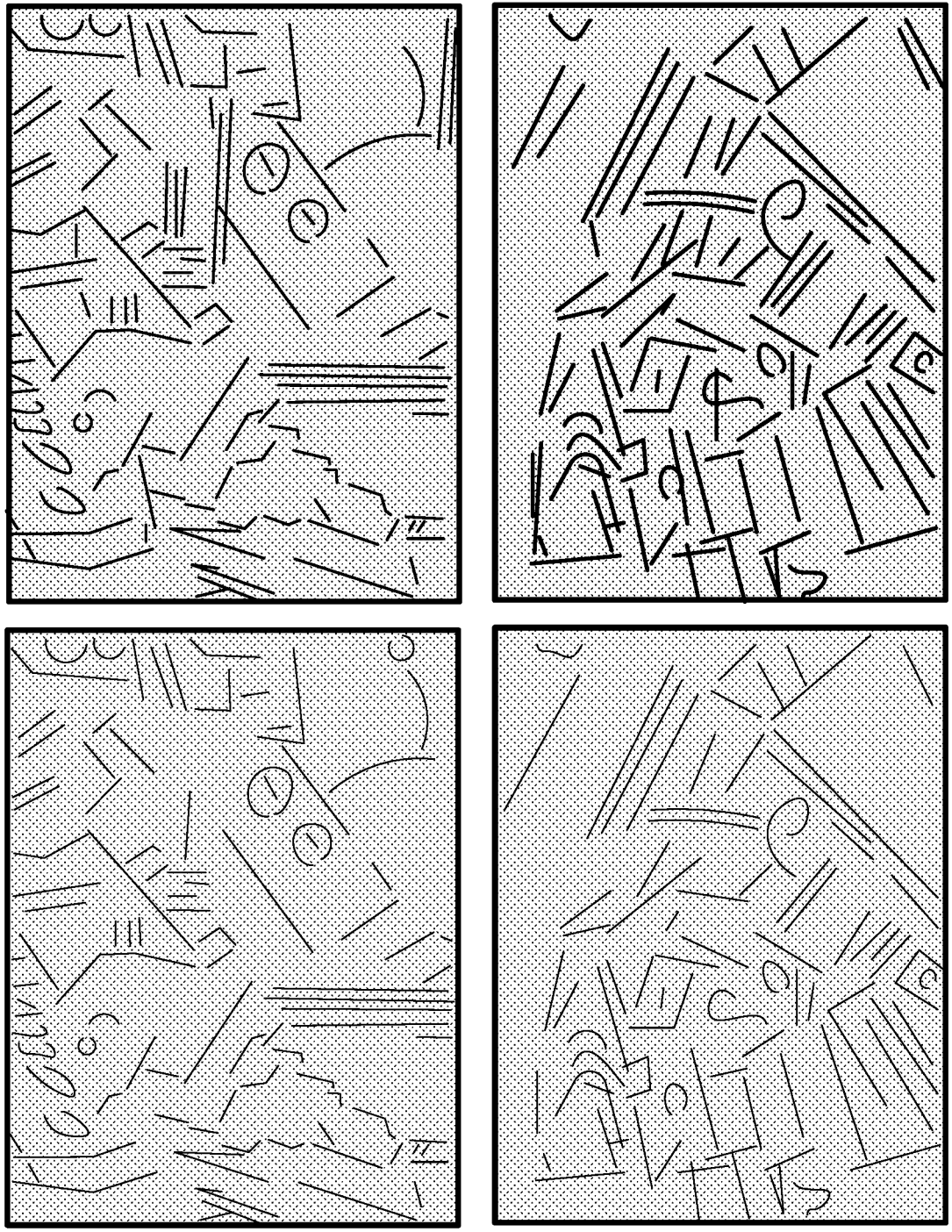
FIG. 4 illustrates example intermediate representations of input images.

An example of the intermediate representation is shown in FIG. 4, where a two-channel intermediate representation of a synthetic input image is shown at the top, and a two-channel intermediate representation of a real input image is shown at the bottom. It is worth noting that because the intermediate representations emphasize domain-invariant, geometric features of the input images while attenuating remaining domain-specific features, the domain gap between the intermediate representations has become negligible.

It should be noted that, while the description in this specification largely relates to using data pre-processing techniques to alleviate issues caused by disparities between real and synthetic domain images, the described techniques can also be used in any of a variety of other scenarios where domain gaps similarly hinder network performance on perception-related tasks. For example, the techniques can be similarly used to pre-process data collected using sensors that are of makes, models, or configurations to ensure that the perception neural network can consistently make accurate perception predictions.

A training engine 240 can use the intermediate representation generation engine 210, the source domain image dataset 222 and, optionally, the target domain image dataset 226 to train the perception neural network 230, that is, to determine trained values for the parameters 250 of the perception neural network 230 and, in some implementations, any additional parameters associated with the image pre-processing engine 210 required for processing the input images to generate corresponding intermediate representations.

In general, the training process involves repeatedly updating respective values of the model parameters 250 to optimize an objective function which evaluates the performance of the perception neural network 230 on a given perception task. At the end of each training iteration, the training engine 240 can compute, e.g., through backpropagation, a gradient 242 with respect to the network parameters of the objective function and then uses the gradient 242 to determine an update the values of the network parameters, e.g., based on an appropriate gradient descent optimization technique, e.g., an RMSprop or Adam optimization procedure.

The training engine 240 can continue training the perception neural network 230 until a training termination criterion is satisfied, e.g., until a predetermined number of training iterations have been performed, or until the gradient of the objective function has converged to a specified value.

After training is complete, the training system 200 can provide a set of trained parameter values 250 to the online execution system 110 for use by the perception subsystem 120, which similarly implements an image pre-processing engine as the training system 200, in accurately generating perception outputs. The training system 200 can provide the set of trained parameter values 250 by a wired or wireless connection to the online execution system 110.

Figure 3:
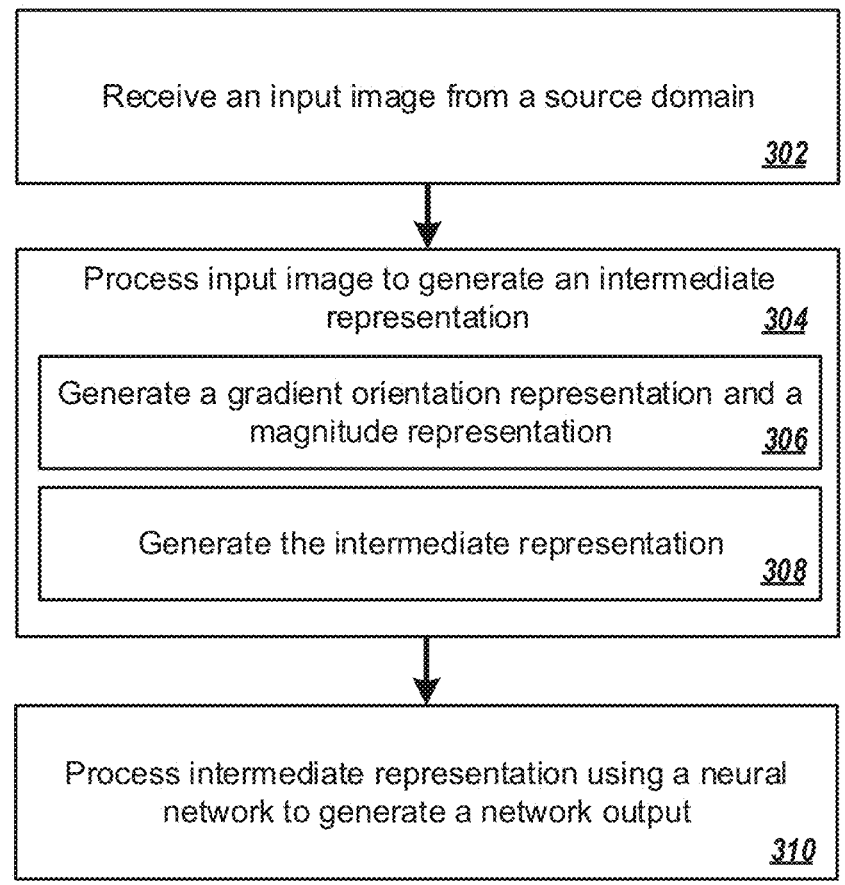
FIG. 3 is a flow diagram of an example process for processing an input image to generate an output.

FIG. 3 is a flowchart of an example process 300 for processing an input image to generate an output. For convenience, the process 300 will be described as being performed by a system of one or more computers located in one or more locations. For example, a system including the image pre-processing engine and the perception neural network, e.g., the system 100 of FIG. 1, appropriately programmed in accordance with this specification, can perform the process 300.

The system receives an input image (302) which can be from either a source domain (e.g., a synthetic domain) or a target domain (e.g., a real domain) that is different from the source domain. The input image can characterize an environment in a vicinity of the robot. For example, the input image can show an object to be manipulated, e.g., grasped, pushed, and/or pulled, by a robot in a robotic process.

The system processes the input image to generate an intermediate representation of the input image (304). The intermediate representation is a shared feature representation of features of the input image that are shared between images from the target domain and images from a source domain different from the target domain. For example, the intermediate representation can be a representation that augments domain-invariant features relating to geometry of objects depicted in the input image, while attenuating other domain-specific features including, for example, illumination, light color, specularities, or reflection.

In particular, in some implementations, the system can generate the intermediate representation as an image gradient-based representation of the input image.

In such implementations, the system first generates a gradient orientation representation and a gradient magnitude representation of the input image (306) by computing a respective derivative of the pixels in the input image, and thereafter computing, from the respective derivatives, the gradient orientation representation and the gradient magnitude representation of the input image.

Specifically, the gradient orientation representation is a directional representation of the image gradients that in turn includes a first sub-representation (i.e., a first channel) specifying orientation of the respective derivatives along a horizontal direction and a second sub-representation (i.e., a second channel) specifying orientation of the respective derivatives along a vertical direction.

The system then generates the intermediate representation of the input image (308) by determining an element-wise product of each of the first and second sub-representations and the gradient magnitude representation. That is, the system determines a respective weighted first and second sub-representations and thereafter uses the weighted sub-representations collectively as a two-channel intermediate representation, where the weights are specified by corresponding elements in the gradient magnitude representation.

Alternatively, the system generates a multi-channel intermediate representation from the weighted sub-representations. This can give the system flexibility in pre-processing input data to adapt to various neural networks configured to receive network inputs in different dimensions or formalities. For example, the system can generate a three-channel intermediate representation by converting the weighted sub-representations into a HSL (hue, saturation, lightness) or a HSV (hue, saturation, value) color encoded representation. As another example, the system can concatenate an additional sub-representation, e.g., a blank channel, to the weighted sub-representations.

An example pipeline for generating an image gradient-based representation is provided below.
1. Normalize the input image to have mean (0,0,0) and standard deviation (1.0,1.0,1.0) (in RGB color space).
2. Compute derivative of each channel separately (for instance using a Sobel filter).
3. Compute the normal covariance of channel derivatives.
4. Compute at each pixel the eigenvectors and eigenvalues from the normal covariance.
5. Derive, from the eigenvectors and the eigenvalues, the main gradient orientation and magnitude at each pixel to output a 2-channel orientation image and a single channel magnitude image.
6. Create a 2-channel image by multiplying each orientation channel by the magnitude channel to emphasize the larger gradients.

The system processes the intermediate representation of the input image (310) using a neural network which has been configured through training to make a prediction about objects in images, i.e., to generate a network output that characterizes the input image in any of a variety of ways. For example, the network output can specify a detection or classification of an object shown in the input image. As another example, the network output can specify an estimated pose of an object shown in the input image. As yet another example, the network output can be a semantic segmentation output that divides, e.g., according to different estimated class labels, the input image into multiple regions.

Generally these network outputs, when provided to a motion planner of the robot, can allow the motion planner to effectively generate a motion plan for controlling the robot. For example, the network outputs can allow the motion planner to determine a position, 3-D pose, or a type of a target object such that the robot can more precisely and efficiently operate on the target object. As another example, the network outputs can allow the motion planner to identify an existence of an obstacle in a path currently followed by the robot so that it can adjust the path to avoid collision with the object.

To this end, the process 300 may be repeated as often as necessary to facilitate generation of motion plans based on the latest state of a workcell. For example, the process 300 may be repeated once per second, or once per 100 milliseconds. As another example, the process 300 can be triggered by receipt of a new observation so that the process is repeated every time there is a new observation of the workcell made by the one or more sensors.

Optionally, the system generates, based on the network output generated at step 310 from an iteration of process 300, a motion plan for the robot to manipulate the object in the robotic process.

In some implementations, the motion plan can be an initial plan that is generated offline from the perception information specified by the network outputs. That is, the system can generate, i.e., prior to the commencement of the robotic process, an offline motion plan and thereafter send the offline motion plan to the robot for execution.

In some implementations, the motion plan can be a modified plan that is generated from a current plan followed by the robot. For example, as the robot begins to execute the initial motion plan, one or more sensors within the workcell can provide updated data regarding the robot and/or the workcell. In response, the system can generate an intermediate representation of the received sensor data and thereafter use the intermediate representation to generate a modified motion plan for the robot that specifies a modified path for the robot to follow that is optimized based on the intermediate representation of the recently received sensor data.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving an input image from a source domain, the input image showing an object to be manipulated by a robot in a robotic process;
processing the input image to generate an intermediate representation of the input image, comprising:
generating a gradient orientation representation and a gradient magnitude representation of the input image; and
generating the intermediate representation of the input image from the gradient orientation representation and the gradient magnitude representation; and
processing the intermediate representation of the input image using a neural network trained to make predictions about objects in images to generate a network output that represents a prediction about physical characteristics of the object in the input image.

Embodiment 2 is the method of embodiment 1, wherein the neural network is trained to learn the geometry of the object in the image.

Embodiment 3 is the method of any one of embodiments 1-2, wherein the network does not allocate capacity to model changes in illumination, light color, specularities, or reflections.

Embodiment 4 is the method of any one of embodiments 1-3, further comprising:
receiving a second input image from a target domain that is different from the source domain, the second input image showing a second object to be manipulated by the robot in the robotic process;
processing the second input image to generate a second intermediate representation of the second input image; and
processing the second intermediate representation of the second input image using the neural network to generate a second network output.

Embodiment 5 is the method of embodiment 4, wherein the target domain is a real domain and the source domain is a synthetic domain.

Embodiment 6 is the method of any one of embodiments 1-5, wherein the first network output is an object detection or classification output.

Embodiment 7 is the method of any one of embodiments 1-5, wherein the first network output is a pose estimation output.

Embodiment 8 is the method of any one of embodiments 1-5, wherein the first network output is a semantic segmentation output.

Embodiment 9 is the method of any one of embodiments 1-8, wherein neural network has been trained on labelled images from the source domain.

Embodiment 10 is the method of any one of embodiments 1-9, wherein generating the gradient orientation representation and the gradient magnitude representation of the input image comprises:
computing a respective derivative of each of some or all pixels of the input image; and
generating, from the respective derivatives, the gradient orientation representation and the gradient magnitude representation of the input image, wherein the gradient orientation representation comprises a first sub-representation specifying orientation of the respective derivatives along a horizontal direction and a second sub-representation specifying orientation of the respective derivatives along a vertical direction.

Embodiment 11 is the method of any one of embodiments 1-10, wherein generating the intermediate representation of the input image from the gradient orientation representation and the gradient magnitude representation comprises, for each of the first and second sub-representations:
determining an element-wise product of sub-representation and the gradient magnitude representation.

Embodiment 12 is the method of any one of embodiments 1-11, wherein generating the intermediate representation of the input image from the gradient orientation representation and the gradient magnitude representation comprises:
generating a HSV color encoded representation of the input image from the gradient orientation representation and the gradient magnitude representation of the input image.

Embodiment 13 is the method of any one of embodiments 1-12, further comprising generating, based on the network output, a motion plan for the robot to manipulate the object in the robotic process.

Embodiment 14 is a system comprising: one or more computers and one or more storage devices storing instructions that are operable, when executed by the one or more computers, to cause the one or more computers to perform the method of any one of embodiments 1 to 13.

Embodiment 15 is a computer storage medium encoded with a computer program, the program comprising instructions that are operable, when executed by data processing apparatus, to cause the data processing apparatus to perform the method of any one of embodiments 1 to 13.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving an input image that is captured by a sensor and that is from a real domain, the input image showing an object to be manipulated by a robot in a robotic process;
processing the input image to generate an intermediate representation of the input image, comprising:
generating (i) a gradient orientation representation that comprises, for each pixel in the input image, a first sub-representation that includes a gradient orientation of the pixel along a horizontal direction and a second sub-representation that includes a gradient orientation of the pixel along a vertical direction and (ii) a gradient magnitude representation of the input image that comprises, for each pixel in the input image, a gradient magnitude of the pixel; and
generating the intermediate representation of the input image based on, for each pixel in the input image, computing a first product between (i) the gradient orientation of the pixel included in the first sub-representation included in the gradient orientation representation and (ii) the gradient magnitude of the pixel included in the gradient magnitude representation and computing a second product between (i) the gradient orientation of the pixel included in the second sub-representation included in the gradient orientation representation and (ii) the gradient magnitude of the pixel included in the gradient magnitude representation;
processing the intermediate representation of the input image using a neural network that has been trained to make predictions about geometry-related characteristics of objects in training images from a synthetic domain to generate a network output that represents a prediction about geometry-related characteristics of the object in the input image that is from the real domain;
generating, based on the network output, a motion plan for the robot to manipulate the object in the robotic process; and
controlling the robot to execute the robotic process to manipulate the object in accordance with the motion plan.

2. The method of claim 1, wherein the neural network is trained to learn the geometry of the object in the image.

3. The method of claim 2, wherein the network does not allocate capacity to model changes in illumination, light color, specularities, or reflections.

4. The method of claim 1, further comprising:
receiving a second input image from the real domain that is different from the synthetic domain, the second input image showing a second object to be manipulated by the robot in the robotic process;
processing the second input image to generate a second intermediate representation of the second input image; and
processing the second intermediate representation of the second input image using the neural network to generate a second network output.

5. The method of claim 1, wherein the network output is an object detection or classification output.

6. The method of claim 1, wherein the network output is a pose estimation output.

7. The method of claim 1, wherein the network output is a semantic segmentation output.

8. The method of claim 1, wherein neural network has been trained on labelled images from the synthetic domain.

9. The method of claim 1, wherein generating the gradient orientation representation and the gradient magnitude representation of the input image comprises:
computing a respective derivative of each of some or all pixels of the input image; and generating, from the respective derivatives, the gradient orientation representation and the gradient magnitude representation of the input image.

10. The method of claim 1, wherein generating the intermediate representation of the input image from the gradient orientation representation and the gradient magnitude representation comprises:
generating a hue, saturation, value (HSV) color encoded representation of the input image from the gradient orientation representation and the gradient magnitude representation of the input image.

11. A system comprising one or more computers and one or more storage devices storing instructions that when executed by the one or more computers cause the one or more computers to perform operations comprising:
receiving an input image that is captured by a sensor and that is from a real domain, the input image showing an object to be manipulated by a robot in a robotic process;
processing the input image to generate an intermediate representation of the input image, comprising:
generating (i) a gradient orientation representation that comprises, for each pixel in the input image, a first sub-representation that includes a gradient orientation of the pixel along a horizontal direction and a second sub-representation that includes a gradient orientation of the pixel along a vertical direction and (ii) a gradient magnitude representation of the input image that comprises, for each pixel in the input image, a gradient magnitude of the pixel; and
generating the intermediate representation of the input image based on, for each pixel in the input image, computing a first product between (i) the gradient orientation of the pixel included in the first sub-representation included in the gradient orientation representation and (ii) the gradient magnitude of the pixel included in the gradient magnitude representation and computing a second product between (i) the gradient orientation of the pixel included in the second sub-representation included in the gradient orientation representation and (ii) the gradient magnitude of the pixel included in the gradient magnitude representation;
processing the intermediate representation of the input image using a neural network that has been trained to make predictions about geometry-related characteristics of objects in training images from a synthetic domain to generate a network output that represents a prediction about geometry-related characteristics of the object in the input image that is from the real domain;
generating, based on the network output, a motion plan for the robot to manipulate the object in the robotic process; and
controlling the robot to execute the robotic process to manipulate the object in accordance with the motion plan.

12. The system of claim 11, wherein the neural network is trained to learn the geometry of the object in the image.

13. The system of claim 12, wherein the network does not allocate capacity to model changes in illumination, light color, specularities, or reflections.

14. The system of claim 11, wherein the operations further comprise:
receiving a second input image from the real domain that is different from the synthetic domain, the second input image showing a second object to be manipulated by the robot in the robotic process;
processing the second input image to generate a second intermediate representation of the second input image; and
processing the second intermediate representation of the second input image using the neural network to generate a second network output.

15. The system of claim 11, wherein generating the gradient orientation representation and the gradient magnitude representation of the input image comprises:
computing a respective derivative of each of some or all pixels of the input image; and
generating, from the respective derivatives, the gradient orientation representation and the gradient magnitude representation of the input image.

16. One or more non-transitory computer-readable storage media storing instructions that when executed by one or more computers cause the one or more computers to perform operations comprising:
receiving an input image that is captured by a sensor and that is from a real domain, the input image showing an object to be manipulated by a robot in a robotic process;
processing the input image to generate an intermediate representation of the input image, comprising:
generating (i) a gradient orientation representation that comprises, for each pixel in the input image, a first sub-representation that includes a gradient orientation of the pixel along a horizontal direction and a second sub-representation that includes a gradient orientation of the pixel along a vertical direction and (ii) a gradient magnitude representation of the input image that comprises, for each pixel in the input image, a gradient magnitude of the pixel; and
generating the intermediate representation of the input image based on, for each pixel in the input image, computing a first product between (i) the gradient orientation of the pixel included in the first sub-representation included in the gradient orientation representation and (ii) the gradient magnitude of the pixel included in the gradient magnitude representation and computing a second product between (i) the gradient orientation of the pixel included in the second sub-representation included in the gradient orientation representation and (ii) the gradient magnitude of the pixel included in the gradient magnitude representation;
processing the intermediate representation of the input image using a neural network that has been trained to make predictions about geometry-related characteristics of objects in training images from a synthetic domain to generate a network output that represents a prediction about geometry-related characteristics of the object in the input image that is from the real domain;
generating, based on the network output, a motion plan for the robot to manipulate the object in the robotic process; and
controlling the robot to execute the robotic process to manipulate the object in accordance with the motion plan.

17. The non-transitory computer-readable storage media of claim 16, wherein the neural network is trained to learn the geometry of the object in the image.

18. The non-transitory computer-readable storage media of claim 16, wherein the network does not allocate capacity to model changes in illumination, light color, specularities, or reflections.

19. The non-transitory computer-readable storage media of claim 16, wherein the network output is an object detection or classification output.

20. The non-transitory computer-readable storage media of claim 16, wherein the network output is a pose estimation output.

* * * * *